United States Patent
Mittal

(10) Patent No.: US 7,336,773 B2
(45) Date of Patent: Feb. 26, 2008

(54) METHOD AND SYSTEM FOR MULTI-MODE COMMUNICATION WITH SENDER AUTHENTICATION

(75) Inventor: Ajay Mittal, Foster City, CA (US)

(73) Assignee: Nokia, Inc., Irving, TX (US)

( * ) Notice: Subject to any disclaimer, the term of this patent is extended or adjusted under 35 U.S.C. 154(b) by 8 days.

(21) Appl. No.: 10/896,218

(22) Filed: Jul. 21, 2004

(65) Prior Publication Data

US 2006/0018445 A1    Jan. 26, 2006

(51) Int. Cl.
*H04M 1/64* (2006.01)
(52) U.S. Cl. .................. 379/88.19; 709/207
(58) Field of Classification Search ............. 379/88.19, 379/88.17; 455/461, 445, 417; 713/169, 713/182, 201; 709/207
See application file for complete search history.

(56) References Cited

U.S. PATENT DOCUMENTS

| 5,742,905 | A* | 4/1998 | Pepe et al. .................. 455/461 |
| 6,880,091 | B1* | 4/2005 | Mattis et al. ................ 713/201 |
| 2004/0236838 | A1* | 11/2004 | Tout ........................... 709/207 |
| 2005/0144450 | A1* | 6/2005 | Voice .......................... 713/169 |
| 2006/0053296 | A1* | 3/2006 | Busboom et al. ........... 713/182 |

OTHER PUBLICATIONS

Silver, Andrew, John Larkins, and Dave Stringer. ND. *Nortel Networks* 2000. "Unified Network Presence Management," 6 pp.

* cited by examiner

*Primary Examiner*—Gerald Gauthier
(74) *Attorney, Agent, or Firm*—Alston & Bird LLP

(57) ABSTRACT

Enabling control over multiple forms of communication to a recipient, such as email, instant messages, cell phone calls, conventional phone calls, faxes, and the like. The recipient defines rules for authenticating senders and for determining when, where, and how communication from the senders is transmitted to the recipient's preferred receiving device(s). The rules are stored in a database of a central service. The central service applies the rules to incoming email, instant messages, calls, faxes, etc. The central service screens unauthentic senders according the recipients rules associated with each form of communication, requiring the sender to provide some proof of identification. If authenticated, the central service enables a sender to communicate with the recipient via the recipient's currently preferred receiving device. If necessary, the central service converts incoming communications to the recipient's preferred form of communication for transmission to the recipient's preferred voice mail, cell phone, instant message service, etc.

20 Claims, 3 Drawing Sheets

METHOD AND SYSTEM FOR MULTI-MODE COMMUNICATION WITH SENDER AUTHENTICATION

FIELD OF THE INVENTION

The present invention is directed to integrating communication from multiple sources, and more specifically to authenticating and routing communication from different senders to one or more selected communication means according to selectable preferences.

BACKGROUND OF THE INVENTION

A number of individual communication means have provisions to store a message or transfer incoming communications to an alternate location. For example, a telephone user can set a call management system to record a voice mail or have a call forwarded to a different phone number. Similarly, an email can be stored or forwarded to a different email address. Most of these communication means only handles its own type of communication. Some communication means cross over. For example, some voice over internet (VOIP) systems can record a voice call and send the voice call as a file in an email to an email address associated with the VOIP telephone system. Similarly, some fax systems can forward an incoming fax as a file to an email address. However, these systems generally have only a single alternate communication means and do not enable a user to select the alternate communication means.

Some presence management systems attempt to track or predict a user's current communication means by monitoring the recipient's usage of different communication means over time. For example, cellular telephone systems can track the locations of a user by cellular towers and determine when the user's cell phone is in use. This information can be compared to short message service (SMS) usage to estimate whether the user currently prefers to receive voice calls or messages. However, this information does not necessarily enable the user to select which form of communication is preferred at any given time. This information also does not necessarily indicate whether the user wishes to pay for the incoming call or simply receive a message. The user can set caller ID to block some calls, but this does not necessarily enable the user to receive a message as an alternative. In general, the user may not have control over how and when communication occurs with multiple communication means.

DETAILED DESCRIPTION OF THE INVENTION

The present invention will now be described with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification, the term "connected" means a direct connection between the things that are connected, without any intermediary devices or components. The term "coupled," or "in communication with" means a direct connection between the things that are connected, or an indirect connection through one or more either passive or active intermediary devices or components. The meaning of "a," "an," and "the" include plural references. The meaning of "in" includes "in" and "on."

Briefly stated, the invention is direct to a method and system for enabling a recipient to control communication to the recipient.

Figure 1:
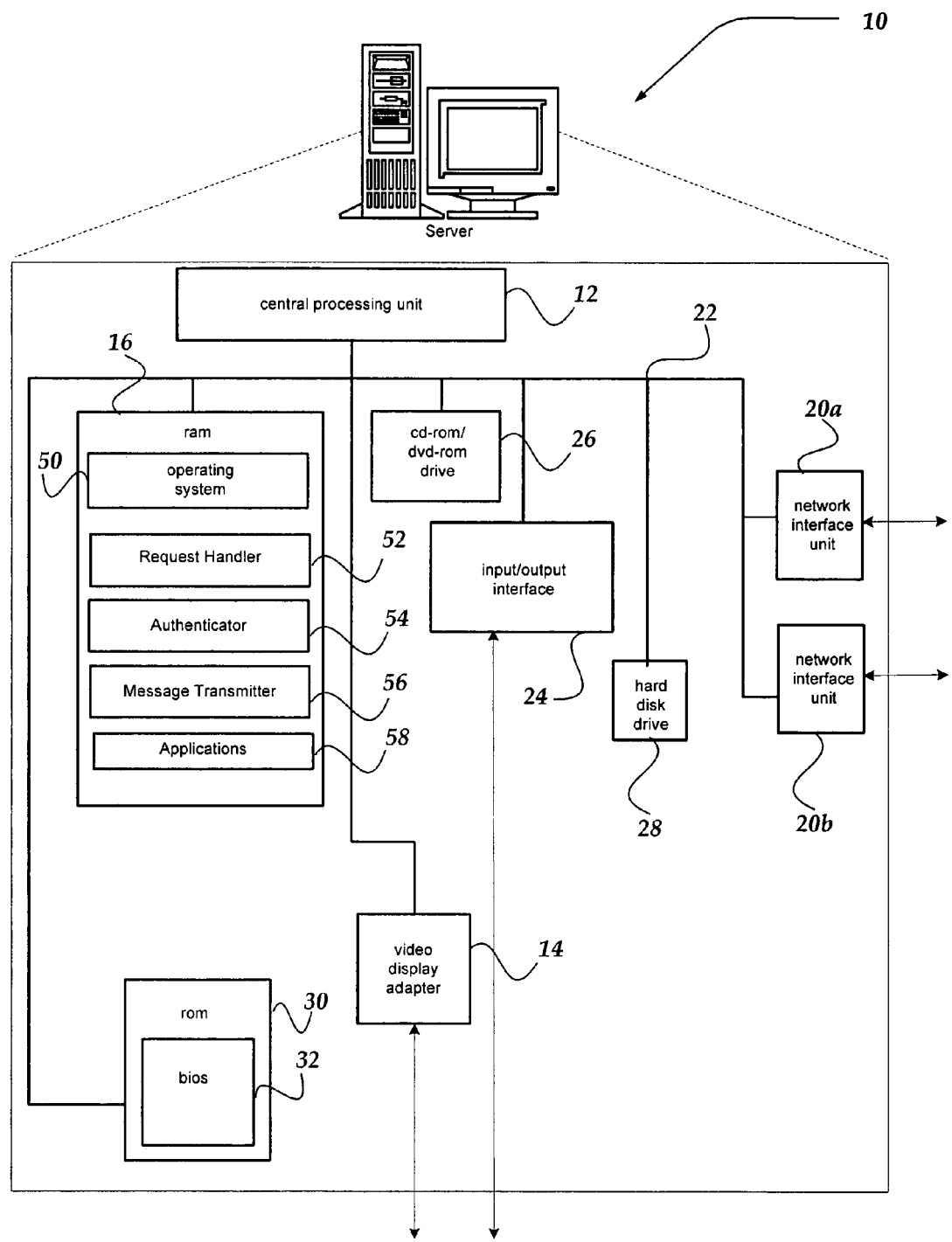
FIG. 1 shows a functional block diagram of an exemplary server according to one embodiment of the invention.

FIG. 1 shows a functional block diagram of an exemplary server 10, according to one embodiment of the invention. Server 10 may include many more components than those shown. The components shown, however, are sufficient to disclose an illustrative embodiment for practicing the invention. Client devices can be similarly configured. Client devices can include, but are not limited to, other servers, personal computers (PCs), personal digital assistants (PDAs), mobile terminals (e.g., cell phones), voice mail systems, and the like. A recipient can also receive messages via other forms of communication, such as fax, voice mail, postal mail, and the like.

Server 10 includes a processing unit 12, a video display adapter 14, and a mass memory, all in communication with each other via a bus 22. The mass memory generally includes RAM 16, ROM 30, and one or more permanent mass storage devices, such as an optical drive 26, a hard disk drive 28, a tape drive, and/or a floppy disk drive. The mass memory stores an operating system 50 for controlling the operation of server 10. Any general-purpose operating system may be employed. A basic input/output system ("BIOS") 32 is also provided for controlling low-level operation of server 10. Server 10 can communicate with the Internet, a telephone network, a postal network, or some other communications network via network interface units 20a and 20b, which are constructed for use with various communication protocols including transmission control protocol/Internet protocol (TCP/IP), code division multiple access (CDMA), time division multiple access (TDMA), global system for mobile communications (GSM), Institute for Electrical and Electronics Engineers (IEEE) 802.11, IEEE 802.16 (WiMax), user datagram protocol (UDP), SMS, general packet radio service (GPRS), Wireless Application Protocol (WAP), and the like. Network interface units 20 and 20b are sometimes known as transceivers, transceiving devices, network interface cards (NICs), and the like. Server 10 also includes input/output interface 24 for communicating with external devices, such as a mouse, keyboard, scanner, or other input devices not shown in FIG. 1.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computing device.

The mass memory also stores program code and data. One or more applications 58 are loaded into mass memory and run on operating system 50. Examples of application programs include database programs, schedulers, transcoders, email programs, calendars, web services, word processing programs, spreadsheet programs, and so forth. Mass storage may further include applications such as a request handler 52 for managing communication requests from senders, an authenticator for authenticating a sender, a message transmitter 56 for communicating with a recipient, and the like.

Figure 2:
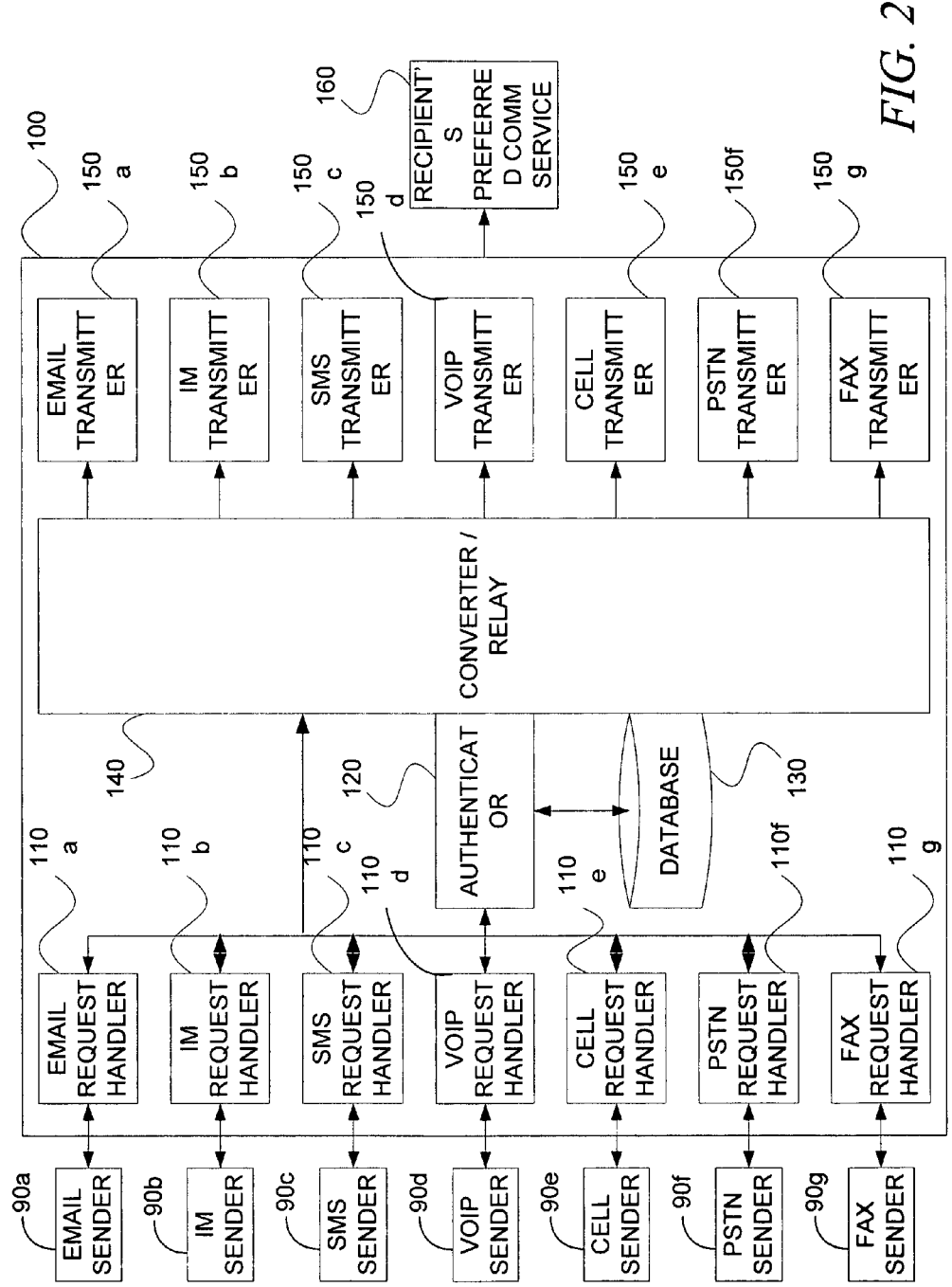
FIG. 2 is a functional block diagram illustrating an overall architecture of an exemplary embodiment of the present invention.

FIG. 2 is a functional block diagram illustrating an overall architecture of an exemplary embodiment of the present invention. One or more senders 90a-90g, communicate with a multi-mode messaging service (MMMS) 100, which authenticates each sender before providing a message and/or relaying the communication to a recipient's preferred communication service 150. Senders 90a-90g can communicate with MMMS 100 in one or more different ways without having to know a recipient's preferred form of communication. Consequently, a sender can send an email, send an instance message, send an SMS message, leave a voice message, send a fax, or any combination thereof. The sender can communicate with individual service providers by using one or more of a desired recipient's unique identifiers, such as an email address, a message address, a telephone number, or the like. The service providers can then forward the communication to MMMS 100. Alternatively, the sender can communicate directly with MMMS 100 and identify the desired recipient with a unique identifier, which can be the same as one of those identifiers above or a different identifier assigned by MMMS 100. The sender is free to send the communication with any means preferred by the sender, such as by email, by SMS, by telephone, by fax, and the like.

A communication is received by a corresponding request handler. For example, an email request handler 110a receives incoming emails according to an appropriate email protocol such as simple mail transfer protocol (SMTP), multi-purpose Internet mail extension (MIME), post office protocol version 3 (POP3), Internet message access protocol (IMAP), and the like. Email request handler 110 can analyze an incoming email to determined the intended recipient by the target email address, and identify the sender by the source email address. Similarly, PSTN request handler 110f can analyze an incoming telephone call to determine the intended recipient by the target telephone number, and determine the sender by the source telephone number. These telephone numbers may be determined by dual tone multifrequency (DTMF) tones, by frequency shift keying (FSK) signals for caller ID, by switched packets, and the like. Other request handlers can receive and analyze incoming communications according to protocols and technologies for instant messages, SMS messages, VOIP calls, cellular calls, faxes, and the like. One or more request handlers can be incorporated as part of a centralized MMMS or as part of a third party service provider, such as an Internet service provider (ISP), a telephone carrier, and the like.

Each request handler communicates with an authenticator 120, which is used to authenticate a sender. Authenticator 120 communicates with a database 130 that stores information on how to authenticate a sender. A recipient, a service provider, and/or MMMS 100 can select and store information on one or more ways by which a sender should be authenticated before any communication would be accepted from the sender. For example, database 130 can store a password, a personal identification number (PIN), and/or some other form of identification that the sender may be required to provide. Alternatively, or in addition, database 130 can store a public encryption key, digital certificate, and/or other security item that may be required with the communication. Authenticator 120 and/or database 130 can be centralized in MMMS 100 or distributed among request handlers 110a-110g.

Authenticator 120 and/or database 130 can also be incorporated into, or separate from, a converter/relay 140, which converts or relays a communication from an authenticated sender to the recipient in a form that the recipient prefers. For example, an email can be converted to an SMS message. A voice communication can be analyzed by a voice recognition process and converted to an instant message. A fax can be analyzed by an optical character recognition process and the text can be synthesized into a voice mail message. Any conversion is possible. Alternatively, a received communication may already be in the form preferred by the recipient. As long as the sender is authenticated, the communication can be simply relayed in that same preferred form.

Converter/relay 140 accesses database 130 for rules a recipient's preferences for receiving an authenticated communication. For example, the recipient may specify that voice calls should be relayed only during certain times of the day. The recipient may also only specify that all communications from certain high-priority senders shall be converted to instant messages and a page and/or other alert shall be sent to the recipient's mobile device. The recipient and/or a other authorized person specify any combination in the rules.

Converter/relay 140 is in communication with a plurality of transmitters 150a-150g that can transmit a message and/or other communication to a compatible device and/or service 160 that is currently preferred by the recipient. Each transmitter uses an appropriate protocol for its form of communication. Each transmitter may also buffer and/or modify an outgoing communication to provide routing information, add header information, and/or otherwise prepare the outgoing communication for delivery. One or more transmitters can be incorporated as part of MMMS 100 or as part of a third party service provider, such as an Internet service provider (ISP), a telephone carrier, and the like. Similarly, the recipient's preferred communication service 160 can comprise a service provider and/or a specific client communication device, such as a PC, PDA, mobile terminal, telephone, pager, fax machine, and the like.

Figure 3:
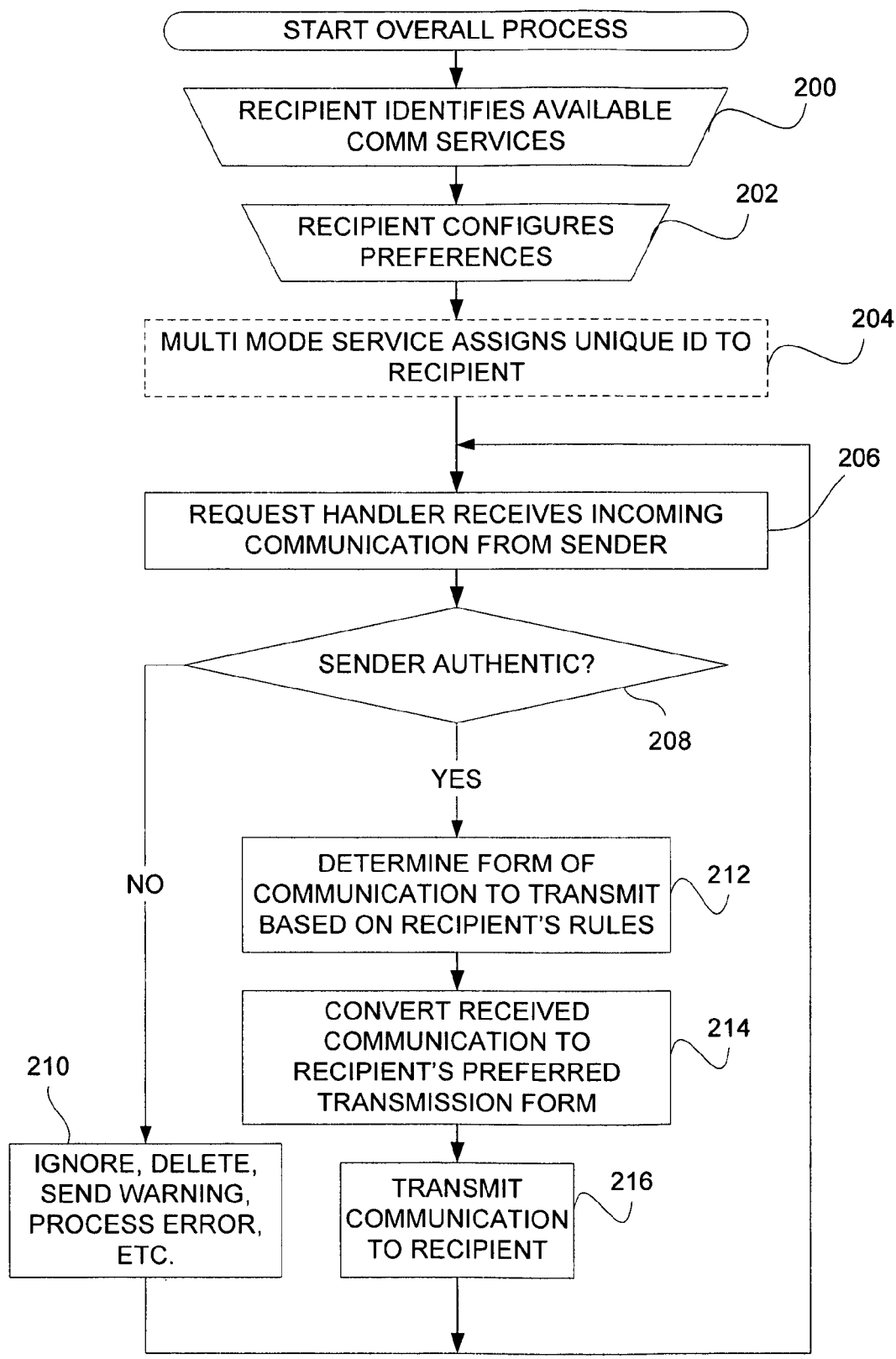
FIG. 3 is a flow diagram illustrating exemplary logic for an overall process using the exemplary architecture of FIG. 2.

FIG. 3 is a flow diagram illustrating exemplary logic for an overall process using the exemplary architecture of FIG. 2. At an operation 200 of FIG. 3, a recipient identifies one or more client communication devices and/or services through which the recipient may wish to receive some communications. For example, the recipient may provide telephone numbers, email addresses, and the like for one or more telephones, faxes, PCs, PDAs, and the like that the recipient uses through one or more telephone carriers, ISPs, and/or other service providers. To provide this information, the recipient may use a browser, a telephone keypad, and/or other user interface to communicate with the MMMS and store the information in the database.

The recipient also uses these interfaces to enter and store authentication requirements and/or preferences at an operation 202. The recipient can provide requirements and/or preferences during an initial configuration and/or whenever a change is desired. Preferences can include, but are not limited to, the recipient's preferred communication service (s) and/or rules for processing received communications. Preferences can be global or limited in time, communication form, and/or other aspects. For example, the recipient can define a rule that all communication received after 5:00 pm and before 8:00 am shall be converted to email and sent to a specific email address. As another example, the recipient can define a rule that all incoming cellular telephone calls from certain individuals shall be relayed to the recipient's cellular telephone, while calls from anyone else shall be converted to emails. Alternatively, the recipient can instruct the MMMS to perform a cost calculation and/or other operation to dynamically determine a best form to transmit the communication. The operation may require the MMMS to access external data, such as current cost data from a service provider. Data determined about the recipient's communication habits can also be used to define and/or refine rules. Data about the recipient can be accessed from external sources and/or the MMMS database.

At an optional operation 204, the MMMS can assign a unique identifier to the recipient during an initial configuration and/or for a separate purpose. The recipient can distribute the unique identifier to desired senders, who can use the unique identifier in communications to a central address, telephone number, or other central contact. The central contact can be the MMMS or a third party service provider such as an ISP, telephone carrier, and the like. The third party service provider can forward the incoming communication to the MMMS. The unique identifier can be detected in an incoming communication and linked to corresponding recipient's email address, telephone number, and/or other individual contact value(s). The unique identifier can also be used as a way to partially or fully authenticate the sender.

At an operation 206, a request handler receives an incoming communication from a sender. The request handler can check for a unique identifier or otherwise determine the target recipient as described above. The request handler also identifies the sender email address, telephone number, or the like. The request handler provides this information to the authenticator. At a decision step 208, the authenticator determines whether the incoming communication was received from an authentic sender. An authentication method can be defined by recipient and stored in the database, so the authenticator accesses the database for information relative to the recipient. Authentication can include interacting with the sender by requesting that the sender enter a password, PIN, and/or other identifier. Decryption, key validation, certificate validation, virus screening, and other security measures can also be performed as part of authentication.

If the sender is not authenticated, the incoming communication can be ignored, deleted, logged, or otherwise processed as unacceptable at an operation 210. The authenticator and/or request handler can further send a warning, report the request to the recipient and/or a third party, perform some error processing, and the like. However, if the sender is authenticated, the MMMS determines the form of communication to transmit to the recipient at an operation 212. The database stores the recipients preferred form of communication, and other rules that can also be applied at operation 212. At an operation 214, the incoming communication is converted to the recipient's preferred form of communication if needed. The resulting communication is then transmitted to the recipient at an operation 216. Control returns to operation 206 to await another incoming communication.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for communication control, comprising:
   receiving a communication, the communication comprising a message directed to a recipient of a messaging service, the recipient comprising an end-user of the service;
   authenticating a sender of the communication based at least in part on a form of authentication selected by the recipient to which the communication is directed, and selected from among a plurality of forms of authentication;
   determining the recipient's preferred form of receiving the communication from among a plurality of forms of receiving communications; and
   enabling the recipient to receive the communication in the preferred form.

2. The method of claim 1, wherein the communication is received as one of:
   a voice mail message;
   an email message;
   an instant message;
   a short message service message;
   a fax; or
   a postal message.

3. The method of claim 1, wherein authenticating the sender comprises confirming at least one of a password, a personal identification number (pin), a digital certificate, a public key, or the sender's return address.

4. The method of claim 1, wherein the form of authentication is further based on the form of the communication received.

5. The method of claim 1, wherein the communication is one of forwarded from a third party or received directly from the sender.

6. The method of claim 1, further comprising enabling the recipient to predefine at least one rule to determine the recipient's preferred form of receiving the communication.

7. The method of claim 6, wherein the at least one rule is based on at least one of an identity of the sender, a time the communication is received, a day the communication is received, a location of the recipient, or a cost of each of the plurality of forms of receiving the communication.

8. The method of claim 1, further comprising converting the communication from a received form to the recipient's preferred form.

9. The method of claim 1, wherein the plurality of forms of receiving the communication by the recipient include:
   as a voice mail message;
   as an email message;
   as an instant message;
   as a short message service message;
   as a fax; and
   as a postal message.

10. The method of claim 1, further comprising providing a user interface through which the recipient selects the predefined form of receiving the communication.

11. An apparatus comprising:
a processor configured to receive a communication, the communication comprising a message directed to a recipient of a messaging service, the recipient comprising an end-user of the service;
wherein the processor is configured to authenticate a sender of the communication based at least in part on a form of authentication selected by the recipient to which the communication is directed, and selected from among a plurality of forms of authentication;
wherein the processor is configured to determine a recipient's preferred form of receiving the communication from among a plurality of forms of receiving communications; and
wherein the processor is configured to enable the recipient to receive the communication in the preferred form.

12. The apparatus of claim 11, wherein the processor is configured to receive the communication as one of:
a voice mail message;
an email message;
an instant message;
a short message service message; or a fax.

13. The apparatus of claim 11, wherein the processor being configured to authenticate the sender includes being authenticated to confirm at least one of a password, a personal identification number (pin), a digital certificate, a public key, or the sender's return address.

14. The apparatus of claim 11, wherein the form of authentication is further based on the form of the communication received.

15. The apparatus of claim 11, wherein the processor is configured to enable the recipient to predefine at least one rule to determine the recipient's preferred form of receiving the communication.

16. The apparatus of claim 15, wherein the at least one rule is based on at least one of an identity of the sender, a time the communication is received, a day the communication is received, a location of the recipient, or a cost of each of the plurality of forms of receiving the communication.

17. The apparatus of claim 11, wherein the processor is configured to convert the communication from a received form to the recipient's preferred form.

18. The apparatus of claim 11, further comprising a user interface though which the recipient selects the predefined form of receiving the communication.

19. A system for communication control, comprising:
a request handler that receives a communication from a sender in one form of a plurality of communication forms, the communication comprising a message directed to a recipient of a messaging service, the recipient comprising an end-user of the service;
an authenticator in communication with the request handler, and authenticating the sender based at least in part on a form of authentication selected by the recipient to which the communication is directed, and selected from among a plurality of forms of authentication;
a converter in communication with the request handler, and converting the communication from the sender to a form preferred by a recipient; and
a transmitter in communication with the converter, and transmitting the converted communication to the recipient.

20. The system of claim 19, further comprising a database in communication with the authenticator and the converter, and storing rules for at least one of authenticating the sender or converting the communication.

* * * * *

UNITED STATES PATENT AND TRADEMARK OFFICE
CERTIFICATE OF CORRECTION

PATENT NO.       : 7,336,773 B2  
APPLICATION NO.  : 10/896218  
DATED            : February 26, 2008  
INVENTOR(S)      : Mittal Page 1 of 1

It is certified that error appears in the above-identified patent and that said Letters Patent is hereby corrected as shown below:

<u>Column 8,</u>

Line 10, "though" should read --through--.

Signed and Sealed this

Eighth Day of July, 2008

JON W. DUDAS  
*Director of the United States Patent and Trademark Office*